(12) United States Patent
Thielen et al.

(10) Patent No.: US 8,857,009 B2
(45) Date of Patent: Oct. 14, 2014

(54) BEAM BLADE WIPER ASSEMBLY HAVING SELF-LOCKING END CAP

(75) Inventors: C. Joseph Thielen, Shelby Township, MI (US); Kyle Moll, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 428 days.

(21) Appl. No.: 13/302,339

(22) Filed: Nov. 22, 2011

(65) Prior Publication Data

US 2012/0124767 A1 May 24, 2012

Related U.S. Application Data

(60) Provisional application No. 61/416,953, filed on Nov. 24, 2010.

(51) Int. Cl.
*B60S 1/38* (2006.01)

(52) U.S. Cl.
CPC .............. *B60S 1/3889* (2013.01); *B60S 1/3879* (2013.01); *B60S 1/381* (2013.01); *B60S 1/3863* (2013.01)
USPC ............... 15/250.43; 15/250.451; 15/250.201

(58) Field of Classification Search
CPC .... B60S 1/3889; B60S 1/3863; B60S 1/3891; B60S 1/3893; B60S 1/3896; B60S 1/3887; B60S 1/3886; B60S 1/3894
USPC ........................ 15/250.43, 250.361, 250.451, 15/250.44–250.48
See application file for complete search history.

(56) References Cited

U.S. PATENT DOCUMENTS

| | | | | |
|---|---|---|---|---|
| 2,728,100 A * | 12/1955 | Oishei | ........................ | 15/250.44 |
| 7,287,296 B2 * | 10/2007 | Vacher | ........................ | 15/250.32 |
| 2007/0174989 A1 | 8/2007 | Moll et al. | | |
| 2008/0235896 A1 * | 10/2008 | Cheng | ........................ | 15/250.201 |
| 2008/0313843 A1 | 12/2008 | Chou | | |
| 2009/0013492 A1 * | 1/2009 | Henin | ........................ | 15/250.452 |
| 2009/0064440 A1 * | 3/2009 | Boland | ........................ | 15/250.48 |

(Continued)

FOREIGN PATENT DOCUMENTS

| | | | | |
|---|---|---|---|---|
| EP | 1698533 A1 * | 9/2006 | ................ | B60S 1/38 |
| WO | WO 2005080161 A1 * | 9/2005 | ................ | B60S 1/38 |

(Continued)

OTHER PUBLICATIONS

Jul. 26, 2012 International Search Report and Written Opinion for PCT/US2011/061827.

*Primary Examiner* — Mark Spisich
*Assistant Examiner* — Andrew A Horton
(74) *Attorney, Agent, or Firm* — Howard & Howard Attorneys PLLC

(57) ABSTRACT

A beam blade windshield wiper assembly including a wiping element and at least one elongated beam. A pair of end caps are operatively mounted to the longitudinal ends of the beam. The end caps include a body and inwardly extending legs that together with the body define a central channel that is adapted to receive the longitudinal ends of the wiping element and the beam. The legs include a retention tab that extends in the direction of the longitudinal axis of the beam and defines a terminal end. The beam includes a notch that corresponds with the retention tab such that the beam is received in the central channel. The retention tab is biased away from the channel until the terminal end of the tab comes into abutting engagement with the notch such that removal of the end cap is prevented.

23 Claims, 6 Drawing Sheets

(56) References Cited

U.S. PATENT DOCUMENTS

| | | |
|---|---|---|
| 2009/0106928 A1* | 4/2009 | Lee .......................... 15/250.361 |
| 2010/0037417 A1 | 2/2010 | Moll et al. |
| 2010/0139026 A1* | 6/2010 | Ku .......................... 15/250.201 |
| 2011/0113581 A1* | 5/2011 | Boland ...................... 15/250.31 |

FOREIGN PATENT DOCUMENTS

| | | | |
|---|---|---|---|
| WO | 2007122569 A2 | 11/2007 | |
| WO | WO 2009071372 A1 * | 6/2009 | ............... B60S 1/38 |
| WO | 2009115408 A1 | 9/2009 | |
| WO | WO 2009115494 A1 * | 9/2009 | ............... B60S 1/38 |

* cited by examiner

BEAM BLADE WIPER ASSEMBLY HAVING SELF-LOCKING END CAP

CROSS REFERENCE TO RELATED APPLICATIONS

This application claims the benefit of U.S. provisional patent application entitled "Beam Blade Wiper Assembly Having Self-Locking End Cap," having Ser. No. 61/416,953, and filed on Nov. 24, 2010.

BACKGROUND OF THE INVENTION

1. Field of the Invention

The present invention relates, generally, to windshield wiper assemblies, and more specifically, to a beam blade windshield wiper assembly having a self-locking end cap.

2. Description of the Related Art

Conventional windshield wiper assemblies known in the related art include some type of blade assembly mounted to an arm which, in turn, is mounted adjacent the windshield and pivotally driven to impart reciprocal motion to the wiper blade assembly across the windshield. A rubber wiping element is supported by the blade assembly and contacts the windshield across the surface to be wiped. The wiper element often incorporates one or more metal strips which act to reinforce the wiper element and facilitate wiping contact by the element across what is typically a curved glass surface. In this context, the wiper arm delivers a downward force to the blade assembly that is distributed thereacross pressing the blade assembly into contact with the windshield. The wiper assemblies may also include an airfoil and a pair of end caps located at the distal ends of the wiper assembly.

In some cases, the end caps serve to retain the metal strips relative to the wiper element, as well as retain the airfoil between the coupler and the end caps. In other circumstances, the end cap may be employed to retain and position the rubber wiping element within the metal strips or may have a feature that allows the rubber wiping element to be removed making the wiper blade refillable.

End caps of the aforementioned type are well known in the related art. Many end caps require a positive and secure mechanism for physically attaching the end cap to the metal strips and/or airfoil component. In order for the end caps to be assembled to either a single, monolithic beam or a pair of metal strips, the end caps typically known in the related art must be flexible such that they may be splayed open when assembled around the splines. In this context, the end cap essentially flexes outwardly and in the general plane of the monolithic beam or metal strips. Alternatively, a separate component is used as a latching mechanism to positively fix the end cap relative to the beam or splines. However, end caps that flex around the beam or splines during assembly are inherently weak and are prone to disengagement during operation of the windshield wiper assembly. This is because the characteristic of flexibility that allows the end cap to be assembled to a monolithic beam or pair of splines also makes it easier for the end cap to become disengaged. In the event that the end cap is inadvertently removed from the assembly, the beam or dual splines may become disengaged from the wiping element and can result in scratching of the surface to be wiped. In addition, the airfoil can also become dislodged as the retaining function of the end cap has been removed.

Beyond the inherent flexibility of end caps of the type generally known in the related art, they also suffer from the disadvantage that they may become disengaged from the end of the monolithic beam or splines when they are struck, inadvertently or on purpose, by ice scrapers used to remove ice from the surface to be wiped.

Accordingly, while wiper assemblies having end caps of the type generally known in the related art have worked for their intended purposes, there remains a need in the art for a wiper assembly that includes an improved end cap that cannot be easily disengaged once it has been installed to either a monolithic beam or a pair of dual splines of the windshield wiper assembly. In addition, there is a need in the art for a windshield wiper assembly having improved end caps of this type that are easy and efficient to install and cost-effective to manufacture.

SUMMARY OF THE INVENTION

The present invention overcomes the disadvantages in the related art in a beam blade windshield wiper assembly including a wiping element that is adapted to contact the surface to be wiped. The wiping element includes opposed longitudinal ends. At least one elongated beam defines a longitudinal axis. The beam acts to support the wiping element and has opposed longitudinal ends. A pair of end caps are operatively mounted to the longitudinal ends of the beam. An airfoil is operatively mounted to the beam and extends between each of the pair of end caps. The end caps include a body and inwardly extending legs that together with the body define a central channel that is adapted to receive the longitudinal ends of the wiping element of the beam. The legs include a retention tab that extends in the direction of the longitudinal axis of the beam and defines a terminal end. The retention tabs extend in a biased fashion toward the central channel. On the other hand, the beam includes a notch that corresponds with the retention tab such that the beam is received in the central channel. The retention tab is biased away from the channel until the terminal end of the tab comes into abutting engagement with the notch such that removal of the end cap is prevented due to the interfering engagement between the flexible tab on the end cap and the notch on the beam.

In this way, the end cap cannot be easily disengaged once it has been installed to either a monolithic beam or a pair of dual splines or rails of the windshield wiper assembly. In addition, the windshield wiper assembly having the improved end cap of this type is easy and efficient to install and cost-effective to manufacture.

BRIEF DESCRIPTION OF THE DRAWINGS

Other objects, features and advantages of the present invention will be readily appreciated as the same becomes better understood after reading the subsequent description taken in connection with the accompanying drawings wherein.

DETAILED DESCRIPTION OF THE PREFERRED EMBODIMENT(S)

Figure 1:
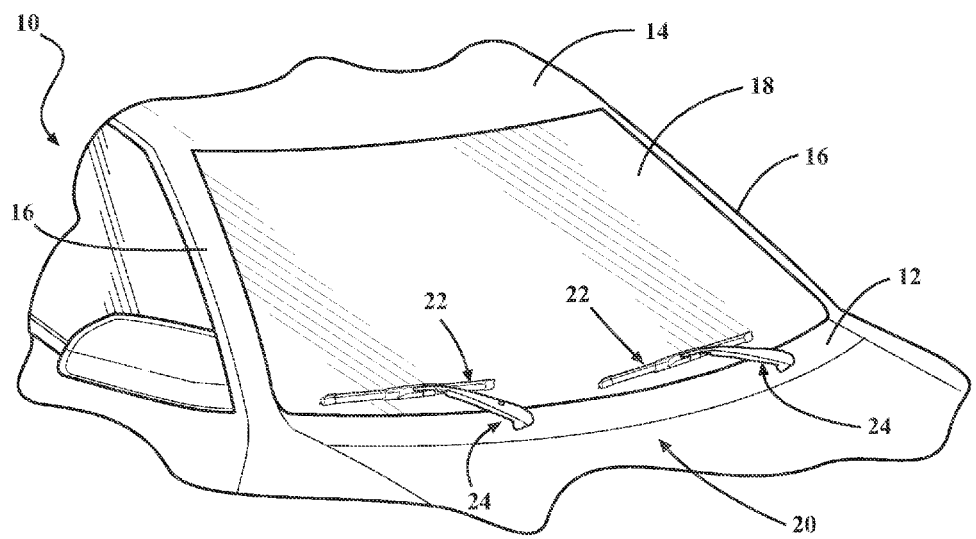
FIG. 1 is a partial perspective view of the front of an automotive vehicle having a pair of windshield wiper assemblies, according to one embodiment of the present invention, pivotally mounted for reciprocal movement across the windshield of the vehicle.

Referring now to the figures, where like numerals are used to designate like structure, a portion of a vehicle is illustrated at 10 in FIG. 1. The vehicle body includes a cowl 12, a roof 14, and a pair of laterally spaced front or "A" pillars 16 extending between the roof 14 and the cowl 12. The A-pillars 16, roof 14, and cowl 12 cooperate to define a generally rectangular perimeter, which supports a curved or "swept back" windshield 18.

A windshield wiper system is generally indicated at 20 in FIG. 1 and is employed to clean the glass windshield 18. In the representative example illustrated herein, the windshield wiper system 20 includes a pair of wiper assemblies, generally indicated at 22, and which correspond to the driver and passenger side of the vehicle 10. However, those having ordinary skill in the art will appreciate that the system could employ a single wiper assembly without departing from the scope of the invention. Each windshield wiper assembly 22 (hereinafter "wiper assembly") is carried by a corresponding wiper arm assembly, generally indicated at 24. The wiper arm assembly 24 includes an attachment member (not shown but generally known in the art) adapted to operatively engage the wiper assembly 22. An electrical motor (not shown but generally known in the art) is typically employed to power the wiper system 20 to move the windshield wiper assemblies 22 in an oscillating manner across the surface of the windshield 18.

While the wiper assembly 22 illustrated in FIG. 1 is shown in connection with the front windshield 18 of the vehicle 10, those having ordinary skill in the art will appreciate that wiper assemblies 22 may be employed in other areas of a vehicle 10, such as a rear window (not shown) or a head lamp (not shown) that employs a wiper system 20. Thus, it will be understood that the present invention is not limited for use solely in connection with wiper arm assemblies 24 and windshield wiper assemblies 22 adapted for use on a vehicle's windshield 18, but for use in all applications where wiper arm assemblies 24 and wiper assemblies 22 are employed.

Figure 2:
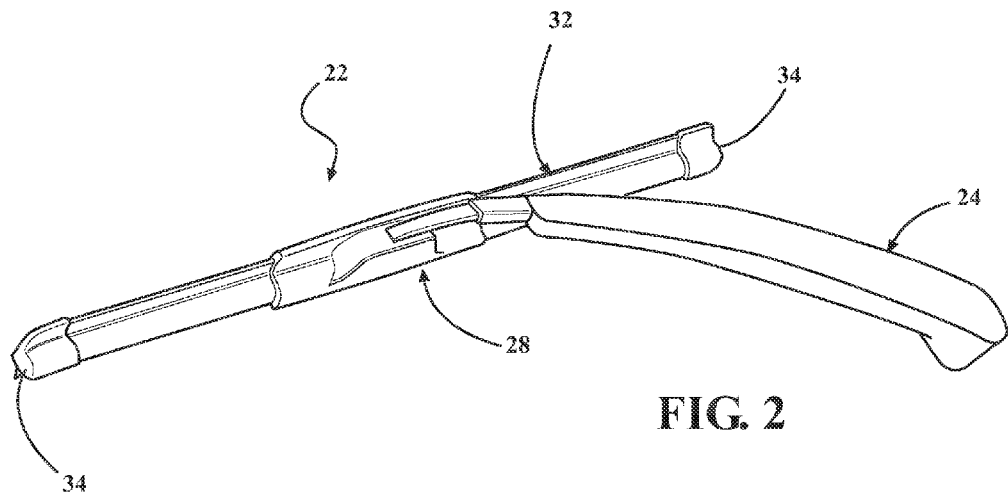
FIG. 2 is a perspective view of the windshield wiper assembly mounted to the wiper arm assembly.
Figure 3:
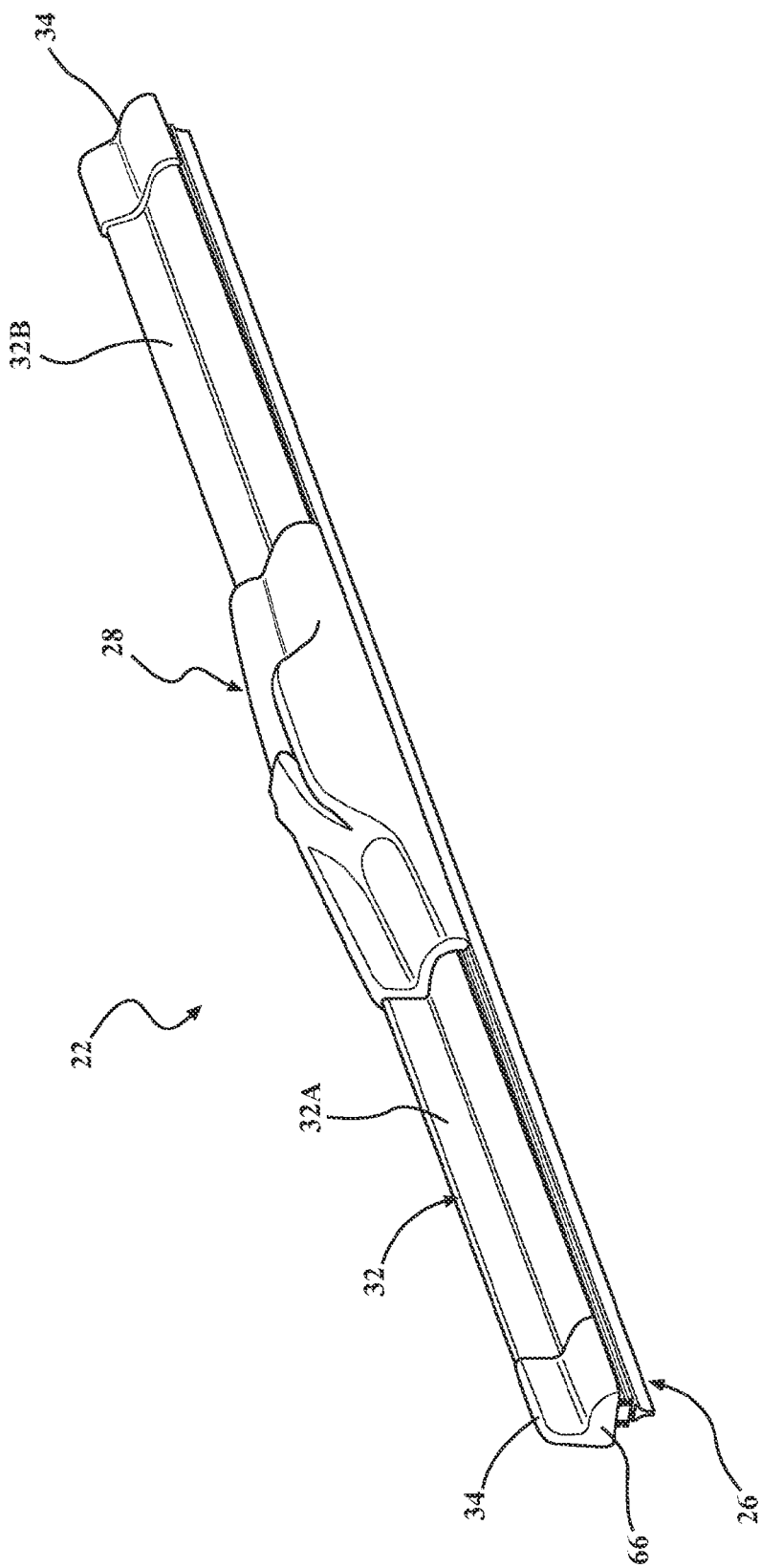
FIG. 3 is a perspective view of a windshield wiper assembly according to one embodiment of the present invention.
Figure 4:
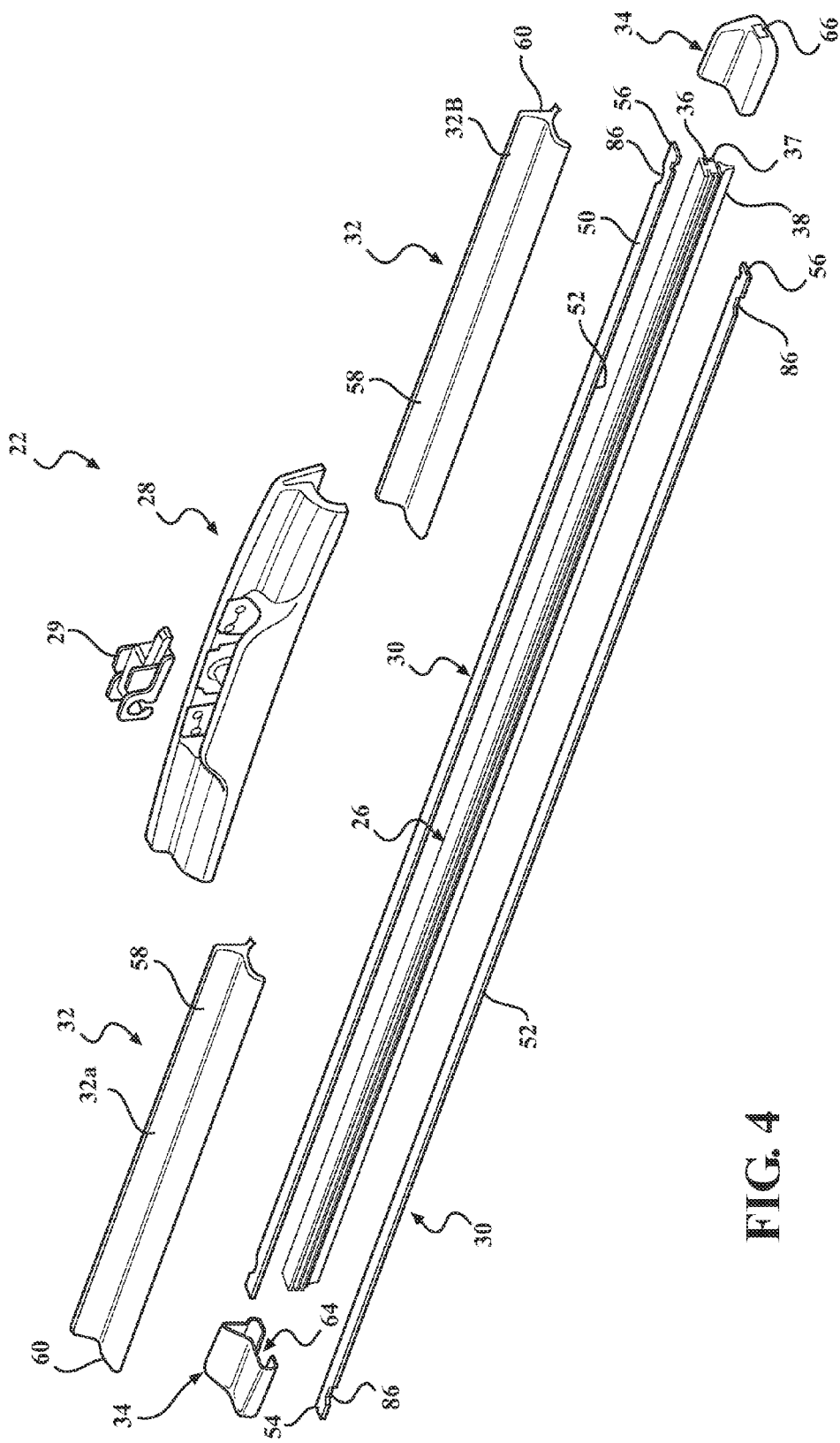
FIG. 4 is an exploded view of the windshield wiper assembly according to one embodiment of the present invention.

Referring to FIGS. 2-4, the wiper assembly 22 includes a wiping element, generally indicated at 26, that is adapted to contact the surface of the vehicle 10 to be wiped, in this representative example, the windshield 18. In addition, the wiper assembly 22 generally includes a coupler assembly, generally indicated at 28, that acts to interconnect the wiper arm assembly 24 and the wiping element 26. The wiper assembly 22 also includes at least one elongated beam 30 that defines a longitudinal axis and that acts to support the wiping element. In the representative embodiment illustrated herein, the beam includes a pair of rails or splines, generally indicated at 30, that are operatively supported in the wiping element. However, those having ordinary skill in the art will appreciate from the description that follows that the beam may be either monolithic or defined by the pair of splines 30. The wiper assembly 22 may also include an airfoil assembly, generally indicated at 32, and a pair of end caps, generally indicated at 34. Each of these components will be described in greater detail below.

Figure 5:
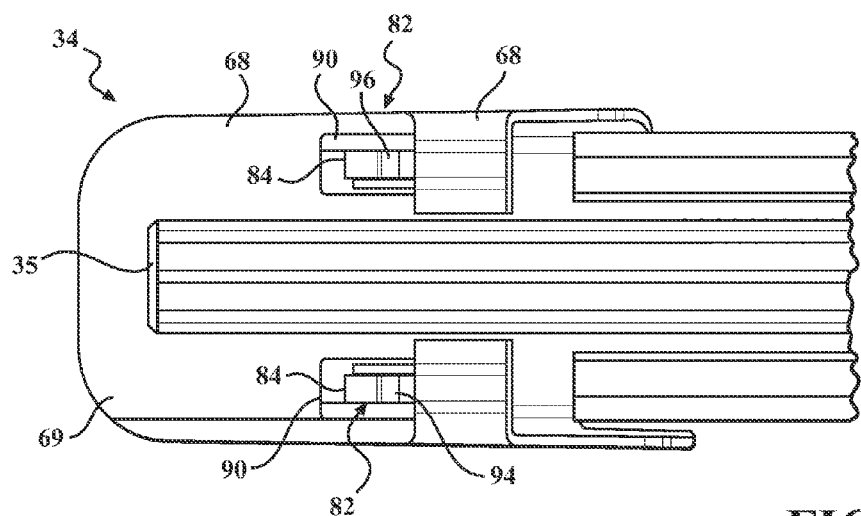
FIG. 5 is a partial perspective bottom view illustrating the end cap mounted to the beam of the wiper blade of the present invention.
Figure 6:
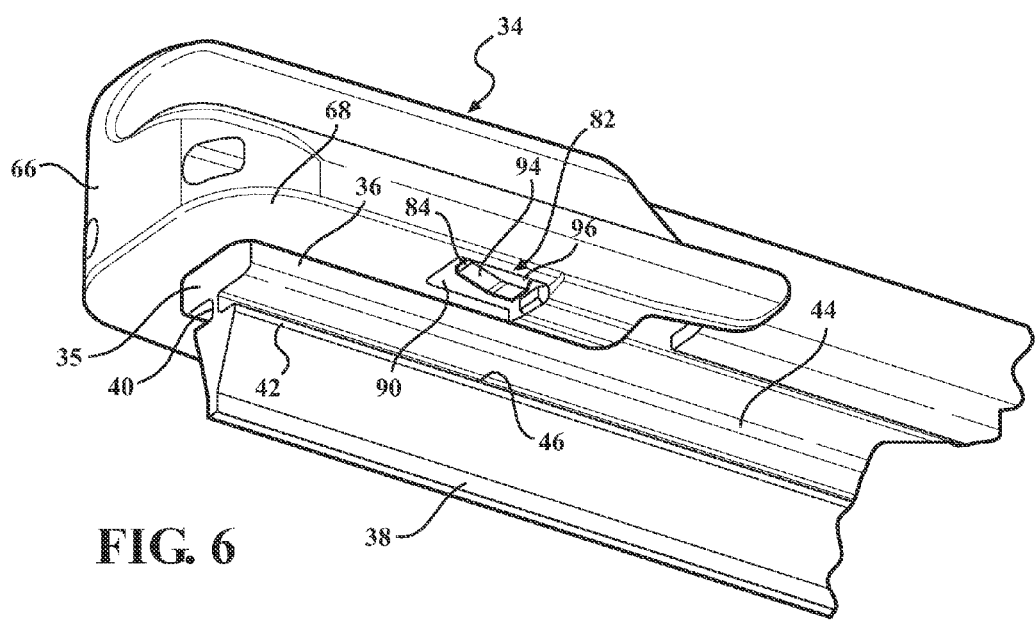
FIG. 6 is a partial perspective elevational view of one embodiment of the end cap mounted to the beam of the wiper blade of the present invention.

As best shown in FIGS. 4-6, the wiping element 26 includes opposed longitudinal ends 35, 37, an upper section 36 and a lower section 38 that are partitioned by a longitudinally extending bridge portion 40. The bridge portion 40 provides flexibility between the upper section 36 and lower section 38 during operational movement of the wiper assembly 22 across the surface to be wiped. The upper section 36 includes a pair of grooves, generally indicated at 42, extending in the direction of the longitudinal axis of the wiping element 26 (FIG. 6). The grooves 42 are disposed on either side of the wiping element 26 and have laterally extending open ends disposed on opposite sides of the wiping element 26 with respect to each other. The grooves define an upper surface 44 and a lower surface 46. The wiping element 26 includes a predetermined length corresponding to particular application and is often manufactured through an extrusion process, which enables the length of the wiping element 26 to be easily adjusted without a substantial increase to manufacturing expense. Furthermore, while the wiping element 26 of the present invention is constructed from a flexible rubber, those having ordinary skill in the art will appreciate that it may be constructed from any flexible material such as silicone or other polymer without departing from the scope of the invention.

As noted above, the windshield wiper assembly 22 further includes a pair of splines or rails, generally indicated at 30. The rails 30 includes an upper surface 50 and a lower surface 52 that extend between first and second longitudinal ends 54 and 56, respectively (FIG. 4). Each rail 30 is adapted to be received in a snug fashion in a corresponding one of the grooves 42 formed on the upper section 36 of the wiping element 26. Thus, the upper surface 50 of each rail 30 is disposed in abutting contact with the upper surface 44 of the corresponding groove 42. Similarly, the lower surface 52 of the rail 30 is disposed in abutting contact with the lower surface 46 of the corresponding groove 42. The rails 30 may be constructed from a resiliently flexible material, such as spring steel or a polymer, and are adapted to apply force from an intermediate position between the first and second longitudinal ends 54 and 56 to the first and second longitudinal ends 54 and 56. More specifically, the rails 30 receive force from the spring-loaded wiper arm assembly 24 at an intermediate position and distribute this force across the span of the rails toward the first and second longitudinal ends 54 and 56. To that end, the rails 30 may be curved longitudinally with a predetermined radius of curvature. This predetermined radius of curvature is sometimes referred to in the related art as a "free form" radius of curvature. Accordingly, the curvature of the rails 30 may be symmetrical or asymmetrical depending on the force requirements and the contour of the windshield 18. The flexible, free form, pre-curved rails 30 straighten out when the wiper arm assembly 24 applies a force thereto to flatten the rails 30 and directs the wiping element 26 to contact the windshield 18. Thus, the elongated rails 30 include a free-form curvature that ensures force distribution on windshields having various curvatures that effects proper wrapping about the windshield 18.

As illustrated throughout the figures, the rails 30 have a substantially constant width and may have a constant thickness throughout the length between the first and second longitudinal ends 54 and 56. The constant width and thickness are adapted to provide high lateral and torsional stiffness to avoid lateral and torsional deflection, which causes the wiping element 26 to stick/slip ("chatter") on the windshield 18 during operation. Thus, the cross-section of the rails 30 has a generally rectangular outer profile that makes the elongated rails 30 easier to manufacture. More specifically, where the rails 30 are constructed from metal, such as spring steel, the tools and machinery used to manufacture the rails 30 are less complicated than that required to manufacture rails having varying widths and/or thicknesses. Furthermore, where the rails 30 are constructed from a polymer, such as a thermoplastic elastomer, the tools and extrusion process machinery are also less complicated than those employed to manufacture rails having varying widths and/or thicknesses. However, those having ordinary skill in the art will appreciate that the rails 30 illustrated herein may include a varying thickness and/or width without departing from the scope of the invention. By way of example, the width and/or thickness of the rails 30 may taper linearly from the beam center, sinusoidally, parabolically, or asymmetrically. Additionally, each rail is illustrated throughout the figures as a single, integral piece of material such that it defines a consolidated cross-section. However, those having ordinary skill in the art will appreciate that the rails 30 may be formed into a single piece by a plurality of laminates.

As noted above and as best shown in FIG. 4, the wiper assembly 22 also includes a coupler assembly, generally indicated at 28. The coupler assembly is adapted to connect the wiper assembly 22 to the wiper arm assembly 24 in any suitable fastener commonly known in the art. More specifically, those having ordinary skill in the art will appreciate that the coupler assembly includes structure that corresponds to at least one particular type of wiper arm assembly attachment member, but may include structure that corresponds to multiple types of wiper arm assembly attachment members. By way of example, different OEM's employ wiper arm assemblies having different attachment members adapted to operatively engage a specific beam blade wiper assembly. Accordingly, the coupler assembly 28 illustrated herein includes structure that operatively engages at least one or more of these different attachment members. Further by way of example, certain wiper arm assemblies employed by OEM's include "bayonet-style"; "pin-type"; or "hook-type" attachment members of various sizes that operatively engage the wiper assemblies. Accordingly, the coupler assembly illustrated herein may include an adapter 29 for operatively engaging at least one or more of these different attachment members for use in connection with wiper assemblies without departing from the scope of the invention.

The airfoil, generally indicated at 32, is operatively mounted to the beam 30, and in the representative example illustrated herein the pair of rails 30. The airfoil 32 extends between each of the pair of end caps 34. The airfoil 32 acts to reduce the likelihood of wind lift by utilizing airflow to generate downward force on to the wiper assembly 22. More specifically, and in the embodiment illustrated herein, the airfoil 32 includes a pair of airfoil components 32A, 32B that are operatively mounted to the pair of rails and extend between the coupler 28 and each of the pair of end caps 34. However, those having ordinary skill in the art will appreciate that the airfoil 32 may be defined by a single unitary component without departing from the scope of the present invention. Each of the airfoil components includes a spoiler 58 that tapers inwardly from the base toward the terminal point to define a profile that is slightly contoured (FIG. 4). Each of the airfoil components 32A, 32B includes a distal end 60. In addition, each of the airfoil components may be manufactured through an extrusion process. However, those having ordinary skill in the art will appreciate that the airfoil 32 may be manufactured using any other conventional means.

As noted above, the wiper assembly 22 of the present invention further includes a pair of end caps, generally indicated at 34. The end caps 34 are adapted to be disposed adjacent to the distal ends 60 of the airfoil 32. The end caps 34 include a profile that substantially mimics the contours of the airfoil 32 to maintain the wind lift characteristics of the wiper assembly 22 and to provide an increased aesthetic value. The end caps 34 also provide a mass increase adjacent the distal ends 60 of the airfoil 32 that prevent localized chatter along the extremities of the wiping element 26 caused by the combination of wind lift and a decrease in the force distributed to this area from wiper arm assembly 24 via the rails 30, as described above.

Figure 7:
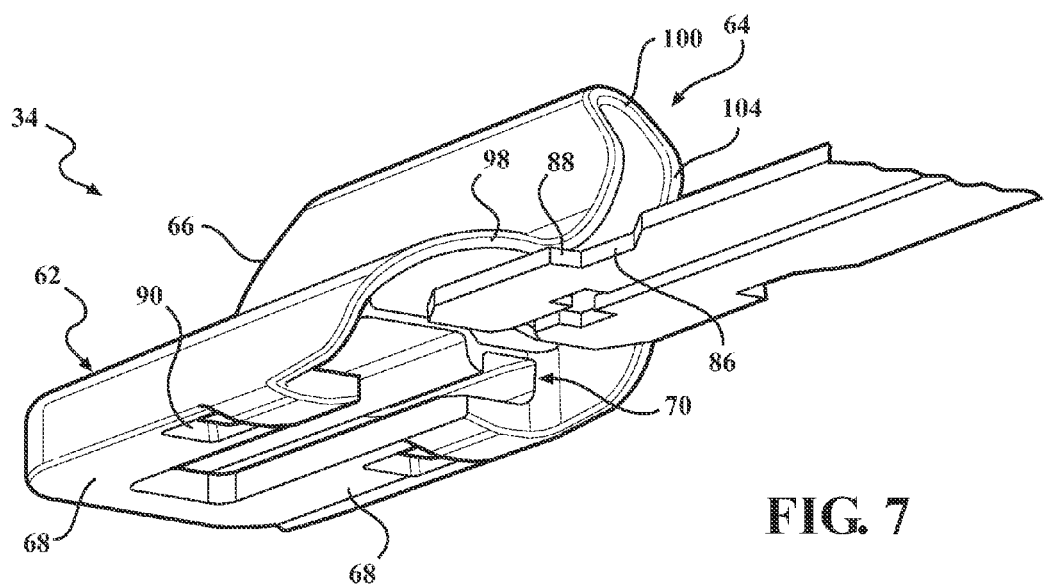
FIG. 7 is a partial perspective assembly view of the end cap mounted to the beam of the wiper blade of the present invention.
Figure 8:
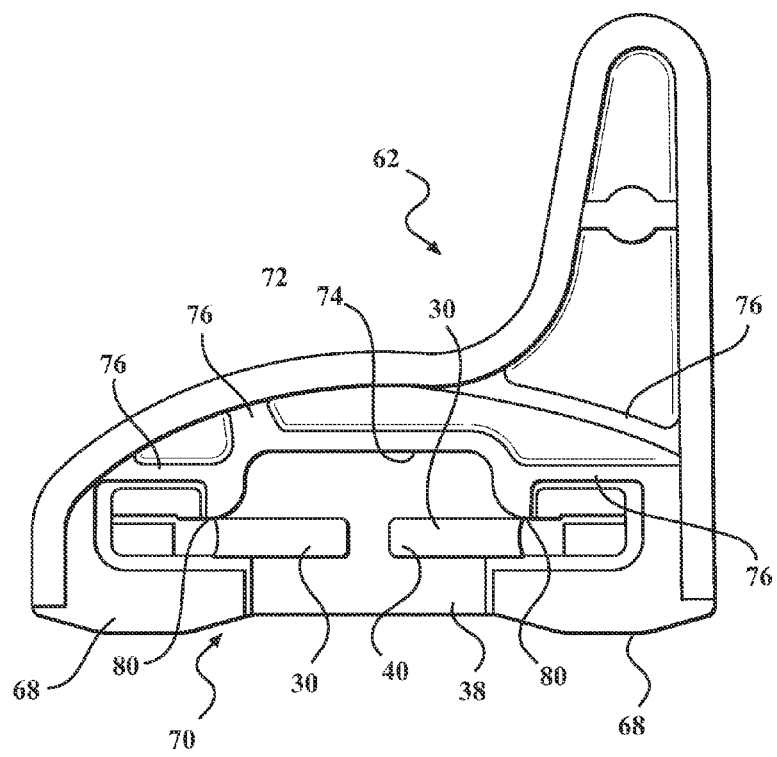
FIG. 8 is a cross-sectional end view of the end cap mounted to the beam that supports the wiping element.

As best shown in FIGS. 7-8, each of the end caps 34 includes a body 62 having an open end 64 and a closed end 66. In addition, the end caps 34 include inwardly extending legs 68. Together, the body 62 and the inwardly extending legs 68 define a central channel, generally indicated at 70, that is adapted to receive the longitudinal ends of the wiping element 26 and the pair of rails 30. The body 62 of the end caps includes a contoured outer surface that substantially corresponds to the contour of the adjacent airfoil component. In addition, the body 62 includes an inner surface 72 disposed opposite to the outer surface and a subsurface 74 that is disposed spaced from the inner surface 72. The subsurface 74 extends a substantial portion of the longitudinal extent of the body 62 and forms the upper extent of the channel 70. A plurality of ribs 76 extend between the subsurface 74 and the inner surface 72 of the body 62.

The subsurface 74 also includes a pair of stanchions 78 disposed in spaced parallel relationship with respect to one another and that extend toward the wiping element 26 for a portion of the longitudinal extent of the channel 70. Each stanchion 78 includes a distal end 80 that is disposed in abutting contact with an associated rail 30 such that the rail 30 is disposed between the leg 68 and the distal end 80 of each of the stanchions 78.

Figure 10:
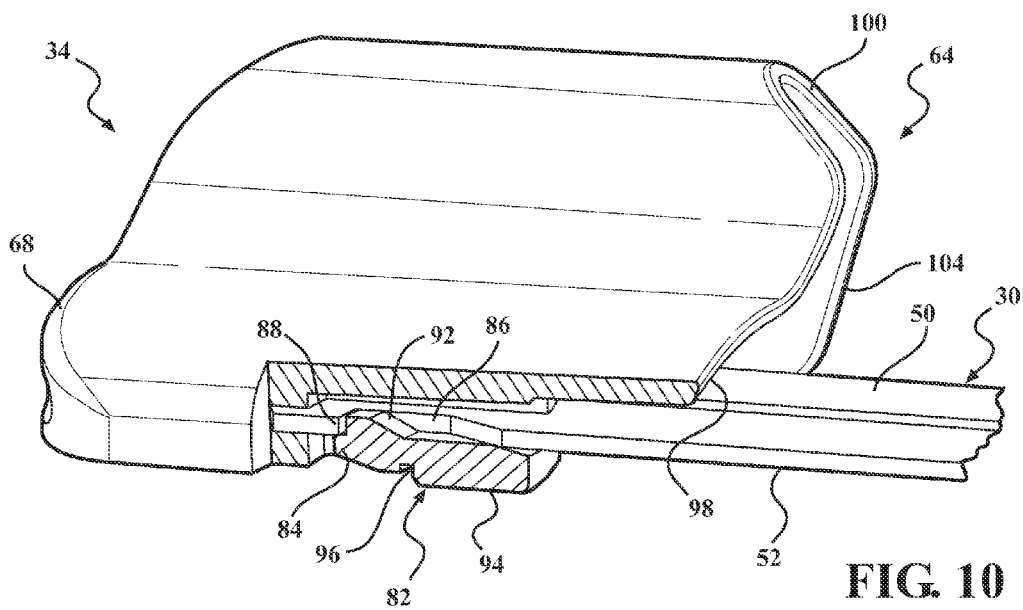
FIG. 10 is a partial perspective assembly view of the end cap mounted to the beam of the wiper blade of the present invention.

As best shown in FIGS. 5-6 and 10, the legs 68 include at least one retention tab, generally indicated at 82, that extends in the direction of the longitudinal axis of the rails 30. In the embodiment illustrated herein, the legs 68 extend substantially about the perimeter of the body 62 and include a pair of retention tabs 82. Each retention tab 82 defines a terminal end 84. In addition, each retention tab 82 extends in a biased fashion toward the central channel 70. On the other hand, each of the rails 32 includes a notch 86 that corresponds with the retention tab 82 such that when the rail 30 is received in the central channel 70, the retention tab 82 is biased away from the channel 70 until the terminal end 84 of the associated tab comes into abutting engagement with its associated notch 86. When the retention tab 82 is disposed in this manner, the removal of the end cap 34 is prevented due to the interfering engagement between the retention tab 82 on the end cap 34 and the notch 86 on the beam 30.

More specifically, each retention tab 82 extends in a direction toward the nearest longitudinal ends 54, 56 of its associated rail 30. Each of the notches 86 in the associated rail 30 defines a surface 88 extending substantially transverse to the longitudinal axis of the associated rail 30 and proximate to the nearest longitudinal end of that rail 30.

In the embodiment illustrated herein, the legs 68 include at least one window 90. The window 90 is associated with the retention tab 82. Thus, in the embodiment illustrated herein, the legs 68 include a pair of windows 90 associated with each of the pair of retention tabs 82. However, those having ordinary skill in the art will appreciate from the description herein that each end cap 34 may employ a single retention tab 82 that is associated with a single notch 86 disposed on an associated rail 30. The retention tab 82 extends in a cantilevered fashion from the leg 68 into the window 90 in the direction of the longitudinal axis of its associated rail 30 and biased toward the central channel 70. Each retention tab 82 includes an upper surface 92 that faces the channel 70 and a lower surface 94 disposed opposite the upper surface 92. Each retention tab 82 also includes a groove 96 extending transverse to the longitudinal axis of its associated rail 30. The groove 96 extends across the lower surface 94 of the retention tab 82. The groove 96 facilitates hinging action about the axis defined by the groove 96 so as to allow the retention tab 82 to flex away from the channel 70 when engaged by its associated rail 30. Thus, when the rail 30 is received in the channel 70 of the end cap 34, the lower surface 52 of the rail 30 comes into frictional engagement with the longitudinal extent of the upper surface 92 of the retention tab 82 to bias the retention tab 82 away from the channel 70 until the retention tab 82 comes into registration with the notch 86. In this way, the retention tab 82 snaps into the notch 86 such that the terminal end 84 thereof comes into abutting engagement with the surface 88 of the notch 86.

Thus, the end cap cannot be easily disengaged once it has been installed to either a monolithic beam or a pair of dual splines or rails of the windshield wiper assembly. In addition, the windshield wiper assembly having the improved end cap of this type is easy and efficient to install and cost-effective to manufacture.

Figure 9:
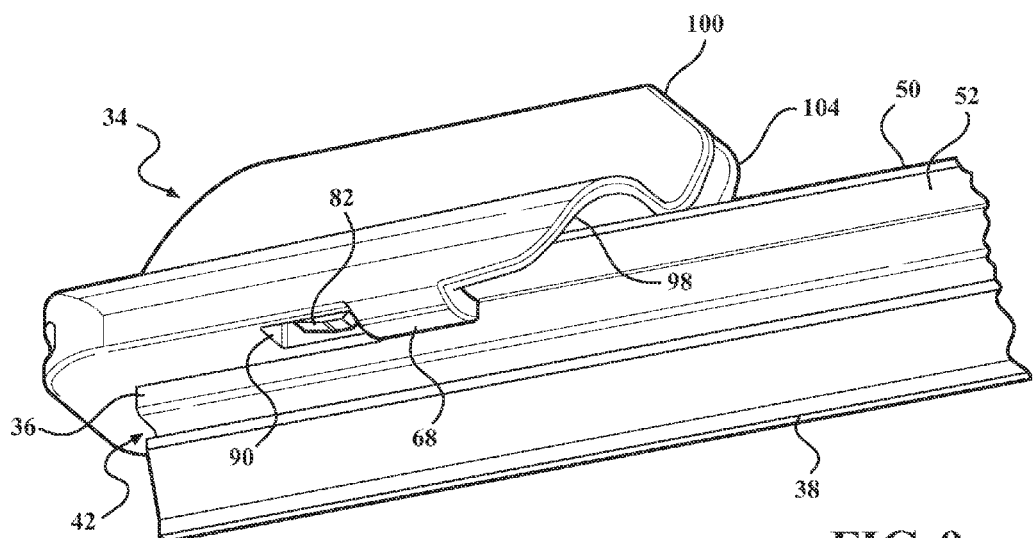
FIG. 9 is a partial perspective elevational view of one embodiment of the end cap mounted to the beam of the wiper blade of the present invention.

The open ends 64 of the end caps 34 cooperate with the distal ends 60 of the airfoil 32 to further resist inadvertent dislodgement of the end caps 34 from the rails 30. More specifically, the open ends 64 of each end cap 34 are contoured and cooperate with the distal ends 60 of the airfoil to reduce the likelihood that the end caps may be inadvertently removed from the assembly. Thus, as best shown in FIGS. 9-10, the open ends 64 of the end caps 34 include a lower section 98 extending in the general direction toward the distal ends 60 of the airfoils 32. In addition, the open ends 64 of the end caps 34 have an upper section 100 that extends generally away from the distal ends 60 of the airfoils 32 and at an obtuse angle relative to a vertical axis. The distal ends 60 of the airfoils 32 define an upper terminal overlay section that cooperates with the upper section 100 of the open end 64 of the end caps 34 so as to be disposed over and in abutting contact with the upper section 100. An intermediate section 104 extends between the lower 98 and upper 100 sections of the open ends 64 of the end caps 34. In this way, the cooperation between the open ends 64 of the end caps 34 and the distal ends 60 of the airfoils 32 prevent the end caps 34 from being inadvertently removed or knocked out of engagement with the rails 30 during operation of the windshield wiper assembly. This is primarily due to the cooperative disposition between the upper section 100 of the open end 64 of the end cap 34 and the terminal overlay section at the distal ends 60 of the airfoil 32 that effectively deflects blows from ice scrapers or other inadvertent contact that can dislodge the end caps 34 of the type known in the related art but which fail to do so with the end cap of the present invention.

The present invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A beam blade windshield wiper assembly comprising:
a wiping element adapted to contact a surface to be wiped, said wiping element includes opposed longitudinal ends;
at least one elongated beam defining a longitudinal axis, said beam acting to support said wiping element and having opposed longitudinal ends;
a pair of end caps operatively mounted to said longitudinal ends of said beam; and
an airfoil operatively mounted to said beam and extending between each of said pair of end caps;
said end caps including a body and inwardly extending legs that together with the body define a central channel that is adapted to receive the longitudinal ends of said wiping element and said beam;
said legs including a retention tab extending in the direction of the longitudinal axis of said beam and defining a terminal end, said retention tab extending in a biased fashion toward said central channel, each of said legs further including at least one window defined in and enclosed by said leg, with said retention tab extending in cantilevered fashion from said leg into said window in the direction of the longitudinal axis of said beam;
said beam including a notch that corresponds with said flexible retention tab such that when said beam is received in said central channel, said retention tab is biased away from said channel until said terminal end of said tab comes into abutting engagement with said notch such that removal of said end caps is prevented due to the interfering engagement between said retention tab on said end caps and said notch on said beam.

2. The beam blade windshield wiper assembly as set forth in claim 1 wherein said retention tab extends in a direction toward the nearest longitudinal end of said flexible beam.

3. The beam blade windshield wiper assembly as set forth in claim 1 wherein said notch defines a surface extending substantially transverse to the longitudinal axis of said beam and proximate to the nearest longitudinal end of said beam.

4. The beam blade windshield wiper assembly as set forth in claim 1 wherein said retention tab includes a groove extending transverse to the longitudinal axis of said beam, said groove facilitating hinging action about the axis defined by the groove to allow said tab to flex away from said channel when engaged by said beam and then snap into said notch such that said terminal end comes into abutting engagement with said notch.

5. The beam blade windshield wiper assembly as set forth in claim 4 wherein said retention tab includes an upper surface facing said channel and a lower surface disposed opposite said upper surface, said groove extending across said lower surface of said retention tab.

6. The beam blade windshield wiper assembly as set forth in claim 1 wherein said beam includes an upper surface and a lower surface, said lower surface coming into frictional engagement with the longitudinal extent of said retention tab to bias said retention tab away from said channel until said retention tab comes into registration with said notch.

7. The beam blade windshield wiper assembly as set forth in claim 1 wherein said body of said end cap includes a contoured outer surface that substantially corresponds to the contour of the airfoil, an inner surface disposed opposite to the outer surface and a subsurface disposed spaced from said inner surface extending a substantial portion of the longitudinal extent of said body and forming the upper extent of said channel.

8. The beam blade windshield wiper assembly as set forth in claim 7 wherein said subsurface includes a pair of stanchions disposed spaced from one another and extending toward said wiping element for a portion of the longitudinal extent of said channel.

9. The beam blade windshield wiper assembly as set forth in claim 8 wherein each of said stanchions includes a distal end disposed in abutting contact with said beam such that said beam is disposed between said legs and the distal ends of each of said stanchions.

10. The beam blade windshield wiper assembly as set forth in claim 7 wherein said body includes a plurality of ribs extending between said subsurface and said inner surface, such that said subsurface is disposed in spaced relationship with respect to said inner surface of said body.

11. The beam blade windshield wiper assembly as set forth in claim 1 wherein said at least one beam includes a pair of rails, each of said rails including at least one notch disposed proximate the longitudinal ends thereof, each of said notches having an open end facing opposite and outwardly with respect to one another.

12. The beam blade windshield wiper assembly as set forth in claim 1 wherein said wiping element includes an upper section, a lower section, and a bridge extending longitudinally therebetween, said upper portion adapted to be received in said channel of said body; said upper section including a pair of grooves extending in the direction of the longitudinal axis of said wiping element, disposed on either side of the upper section and having laterally extending open ends disposed on opposite sides of the wiping element with respect to each other;
a pair of rails adapted to be received in snug fashion in a corresponding one of said grooves.

13. The beam blade windshield wiper assembly as set forth in claim 1 wherein said end caps include an open end that is adapted to receive said at least one beam and a closed end that covers the longitudinal ends of said beam, said open end including a contoured surface that corresponds with the associated surface of first and second distal ends of said airfoil.

14. A beam blade windshield wiper assembly comprising:
a rubber wiping element adapted to contact the surface to be wiped, said wiping element including opposed longitudinal ends, an upper section, a lower section, and a bridge extending longitudinally therebetween, said upper section including a pair of grooves extending in the direction of a longitudinal axis of said wiping element, and disposed on either side of the upper section, each of said grooves having laterally extending open ends disposed on opposite sides of said wiping element with respect to each other;
a pair of elongated rails defining a longitudinal axis, each of said rails adapted to be received in snug fashion in a corresponding one of said grooves and acting to support said wiping element, each of said rails including opposed longitudinal ends;
a pair of end caps operatively mounted to said longitudinal ends of said pair of rails;
a coupler assembly mounted to said pair of rails between said longitudinal ends thereof, said coupler assembly adapted to interconnect said windshield wiper assembly and a wiper arm that drives the wiper assembly in oscillating fashion across the surface to be wiped;
a pair of airfoil components operatively mounted to said pair of rails and extending between said coupler and each of said pair of end caps;
said end caps including a body and inwardly extending legs that together with the body define a central channel that is adapted to receive the longitudinal ends of said wiping element and said rails;
said legs including at least one a retention tab extending in the direction of the longitudinal axis of said rails and defining a terminal end, said retention tab extending in a biased fashion toward said central channel, each of said legs further including at least one window defined in and enclosed by said leg, with said retention tab extending in cantilevered fashion from said leg into said window in the direction of the longitudinal axis of said rails;
each of said rails including a notch that corresponds with said retention tab such that when each of said rails is received in said central channel, said retention tab is biased away from said channel until said terminal end of said tab comes into abutting engagement with said notch such that removal of said end caps is prevented due to the interfering engagement between said retention tab on said end caps and said notch on said rail.

15. The beam blade windshield wiper assembly as set forth in claim 14 wherein said retention tab extends in a direction toward the nearest longitudinal end of said rails.

16. The beam blade windshield wiper assembly as set forth in claim 14 wherein said notch defines a surface extending substantially transverse to the longitudinal axis of said rails and proximate to the nearest longitudinal end of said rails.

17. The beam blade windshield wiper assembly as set forth in claim 14 wherein said retention tab includes a groove extending transverse to the longitudinal axis of said rails, said groove facilitating hinging action about the axis defined by the groove to allow said tab to flex away from said channel when engaged by said rail and then snap into said notch such that said terminal end comes into abutting engagement with said notch.

18. The beam blade windshield wiper assembly as set forth in claim 17 wherein said retention tab includes an upper surface facing said channel and a lower surface disposed opposite said upper surface, said groove extending across said lower surface of said retention tab.

19. The beam blade windshield wiper assembly as set forth in claim 14 wherein said rails include an upper surface and a lower surface, said lower surface coming into frictional engagement with the longitudinal extent of said retention tab to bias said retention tab away from said channel until said retention tab comes into registration with said notch.

20. The beam blade windshield wiper assembly as set forth in claim 14 wherein said body of said end cap includes a contoured outer surface that substantially corresponds to the contour of the airfoil, an inner surface disposed opposite to the outer surface and a subsurface disposed spaced from said inner surface extending a substantial portion of the longitudinal extent of said body and forming the upper extent of said channel.

21. The beam blade windshield wiper assembly as set forth in claim 20 wherein said subsurface includes a pair of stanchions disposed spaced from one another and extending toward said wiping element for a portion of the longitudinal extent of said channel.

22. The beam blade windshield wiper assembly as set forth in claim 21 wherein each of said stanchions includes a distal end disposed in abutting contact with said rails such that said rails are disposed between said legs and the distal ends of each of said stanchions.

23. The beam blade windshield wiper assembly as set forth in claim 14 wherein each of said rails includes at least one notch disposed proximate the longitudinal ends thereof, each of said notches having an open end facing opposite and outwardly with respect to one another.

* * * * *